United States Patent

[11] 3,534,839

[72] Inventors George T. R. Campbell;
Norman V. Laskey, Montreal, Quebec, Canada
[21] Appl. No. 811,380
[22] Filed March 28, 1969
[45] Patented Oct. 20, 1970
[73] Assignee Said Campbell assignor to Algoship International Limited
Nassau, Bahamas,
[32] Priority Feb. 18, 1969
[33] Canada
[31] 43,304

[54] COMBINED TORSIONAL VIBRATION DAMPER AND CLUTCH
7 Claims, 3 Drawing Figs.
[52] U.S. Cl. .................................................. 192/79, - 192/88,106.1;114
[51] Int. Cl. .................................................. F16d 11/06, F16d 47/02

[50] Field of Search .......................................... 192/79, 88(B), 114, 106.1; 188/152(86)

[56] References Cited
UNITED STATES PATENTS
| | | | |
|---|---|---|---|
| 2,029,516 | 2/1936 | Tower | 192/106.1 |
| 2,208,807 | 7/1940 | Weiher | 192/114(X)UX |
| 2,232,584 | 2/1941 | Aitken | 192/114(UX)UX |
| 2,242,184 | 5/1941 | Reuter | 192/88(B)(UX)UX |

Primary Examiner—Allan D. Herrmann
Attorney—Fetherstonhaugh and Co.

ABSTRACT: A flexible coupling and clutch between driving and driven shafts, including a driving member mounted on the end of a driving shaft and a driven member concentrically mounted about the driving member and flexible means connecting the driving and driven members, a clutch drum concentrically mounted on the driven member and capable of limited axial movement, and a clutch concentrically mounted about the clutch drum and fixedly connected to the driven shaft.

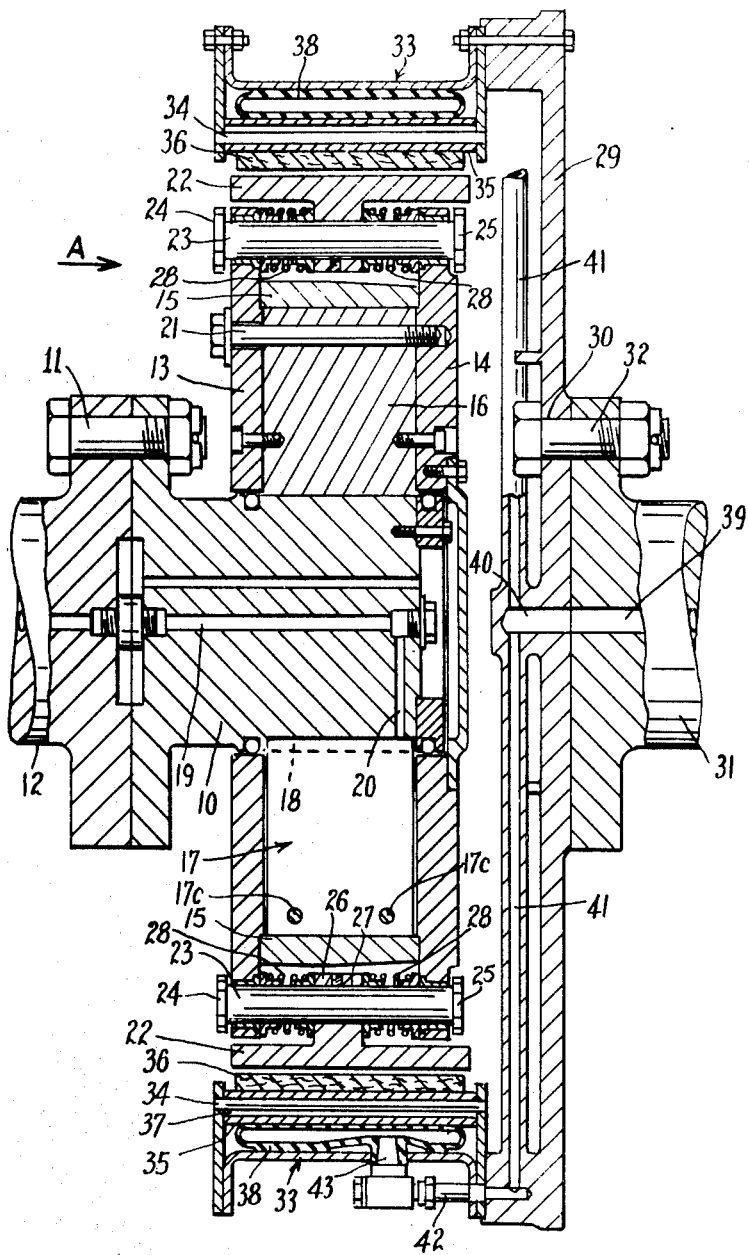
Fig. I

Patented Oct. 20, 1970
3,534,839
Sheet 2 of 2
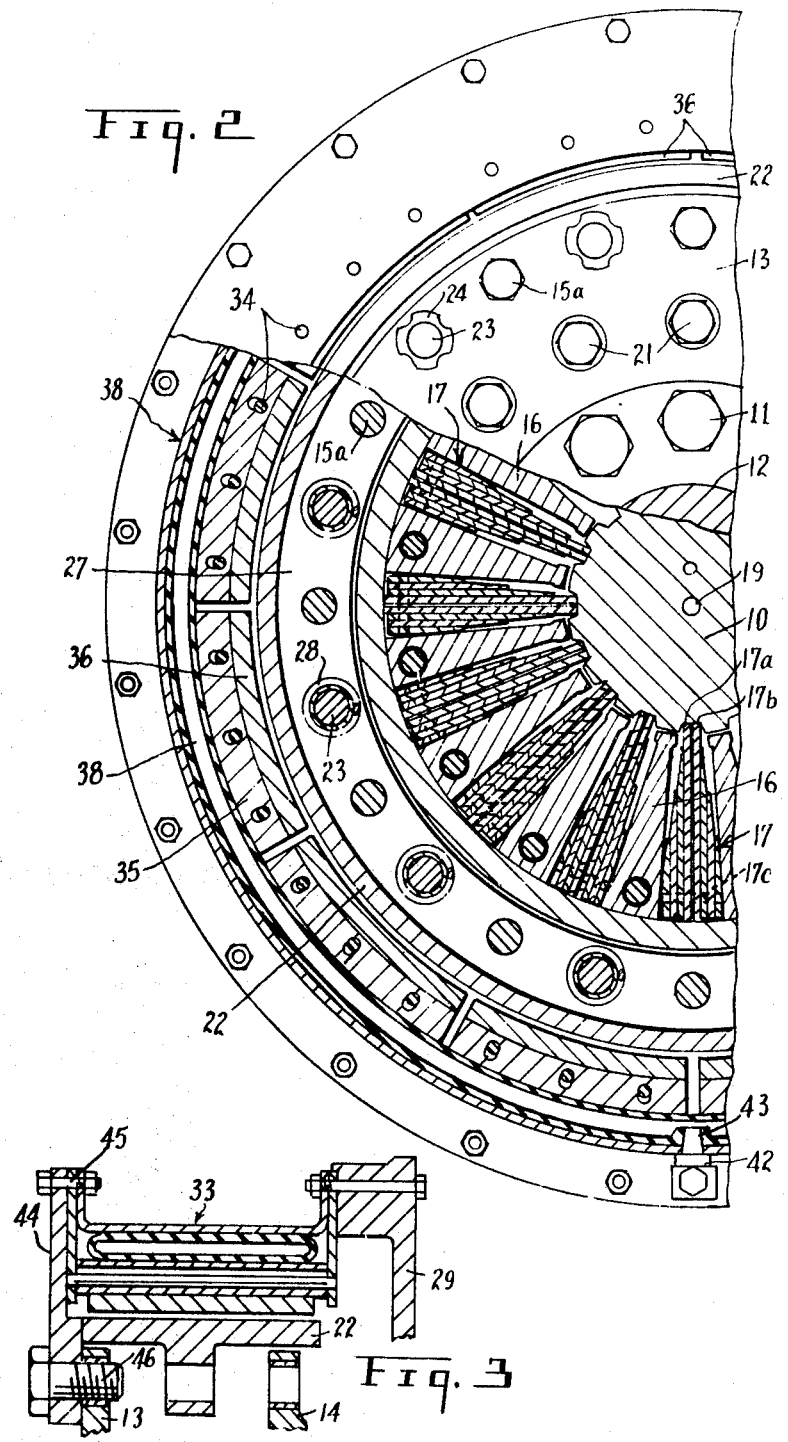
INVENTORS
G.T.R. CAMPBELL
N.V. LASKEY
Fetherstonhaugh & Co.
ATTORNEYS

COMBINED TORSIONAL VIBRATION DAMPER AND CLUTCH

The present invention relates to a combination of a flexible coupling of the torsional vibration dampening type with a clutch which is concentrically disposed relative to the coupling. While the combination of the invention may be employed in any one of a host of operations which require a vibration dampened disconnectible driving connection between a prime mover and a driven apparatus, it is especially designed and particularly useful to provide the drive connection between a medium speed diesel engine and the reducing gear train which drives the propeller of a ship.

In such marine applications it is currently considered essential to provide a clutch or some such drive disconnecting means to enable the engine to be tested while the vessel is berthed alongside a quay; and also to prevent undue wear and tear on the engine, especially during the multiplicity of engine stops which occur when the vessel is being maneuvered in and out of port or when passing through restricted waterways or canals.

In all such marine applications known to the present inventors, the coupling and clutch have been mounted one behind the other between the engine and the pinion of the reduction gearing. In such circumstances the physical dimensions and weight of the clutch and coupling usually require the introduction of an additional supporting bearing interposed between the coupling and the clutch. Furthermore, the disposition of the coupling and clutch one behind the other requires considerable space.

The present invention overcomes these difficulties through the provision of a design which combines a flexible coupling and a clutch in a compact package in which the coupling and clutch elements are concentrically located. The invention may be generally defined as a combined flexible coupling and clutch, said flexible coupling being of the type which comprises a driving portion, a driven portion concentrically mounted on said driving portion for rotation relative thereto and flexible means connecting said driving and driven portions; said clutch comprising a clutch drum concentrically mounted on said driven portion so as to be rotatable therewith but capable of limited axial movement with respect thereto, biasing means urging said clutch drum to normally occupy a position of symmetric alignment with said driven portion, a clutch housing independently mounted in concentric radially spaced relation to said clutch drum, means for rigidly connecting said housing to a shaft to be driven by said coupling, lined clutch shoes mounted within said clutch housing and movable radially toward and away from said drum, and means for forcing said clutch shoes into tight frictional engagement with said clutch drum.

In the drawings which illustrate a presently preferred embodiment of the invention:

FIG. 1 is a vertical longitudinal section;

FIG. 2 is a partial end view looking in the direction of the arrow A in FIG. 1, with part of the forward coupling plate removed, and FIG. 3 is a partial vertical section similar to the upper portion of FIG. 1, but additionally showing an emergency drive arrangement.

The flexible coupling may be of any conventional design in which steel springs or rubber blocks are employed as the medium for damping or reducing torsional oscillations of large amplitude in the crank-shaft of a medium speed diesel engine, when it is used to drive a ship's propeller through single or double reduction gearing. Similarly the clutch employed may be of any suitable type which will transmit the power from the flexible coupling to the driven shaft.

The flexible coupling and clutch here shown are for illustrative purposes only and are not to be taken as in any way restricting the invention which resides in the provision of a clutch drum located concentrically with the coupling and is mounted on driving bolts passing through the end plates of the outer member of the coupling, with provision to enable the clutch drum to have a degree of movement in the axial direction in relation to the outer member of the coupling. In order to achieve this degree of axial movement of the clutch drum coil springs are located on either side of a central internal rim on the clutch drum and the inward facing surfaces of the end plates of the outer member of the coupling, thus ensuring that the clutch drum will always return to a preselected axial location with respect to the outer member of the coupling. This is necessary to avoid any likelihood of end thrust generated in the driven component being transmitted to the driving component, which in this case is the crank shaft of a diesel engine.

A typical combination of flexible coupling and clutch with which is incorporated the present invention is hereinafter described.

The flexible coupling shown consists of a stub shaft 10 rigidly connected by means of bolts 11 to the crankshaft 12 of the prime mover (not shown). A pair of coupling plates 13 and 14 are rotatably mounted on the stub shaft 10 in parallel spaced apart relation to one another, and are held in this position by a spacing ring 15, a plurality of bolts 15a which pass through the coupling plates 13 and 14 adjacent their peripheries and cause said plates to bear against the ring 15.

The plates 13 and 14 support between them a plurality of radially arranged spacer elements 16, and a plurality of leaf springs 17 are mounted between each adjacent pair of spacer elements 16. The inner ends of the two central leaf springs 17a and 17b of each group of springs rest in axial recesses or splines 18 provided in the periphery of the stub shaft 10, as best seen in FIG. 2.

As will readily be appreciated by those familiar with flexible type couplings, 10 is the driving portion of the coupling whilst the plates 13 and 14 jointly constitute the driven portion of the coupling, the flexible driving connection being provided by the leaf springs 17. Lubricating oil may be fed through a longitudinal passageway 19 in the stub shaft 10 to a plurality of radial passageways 20 leading to the spaces where the leaf springs 17 are located between the spacer members 16. The spacer members 16 are held in fixed position relative to the coupling plates 13 and 14 by means of bolts 21; and the leaf springs between each pair of spacer elements 16 are secured to one another by pins 17c passing through the group of leaf springs adjacent their outer ends.

The typical clutch here shown is mounted concentrically of the flexible coupling which has just been described. A clutch drum 22 of cylindrical formation is mounted concentrically and in outwardly spaced relation to the outer peripheries of the coupling plates 13 and 14 by means of a plurality of pins 23 passed axially through the coupling elements 13 and 14 and secured thereto by means of spring washers 24 and 25, the clutch drum being mounted for axial sliding movement on the pins 23 by means of bosses 26 which extend inwardly from the clutch drum 22 and are provided with bores 27 dimensioned to slidably accommodate the pins 23.

Two cylindrical springs 28 are mounted on each pin 23, one spring bearing against the inner face of one of the coupling plates and the adjacent side of the boss 26. The spring 28 will be seen to bias the boss 26 so as to normally urge the clutch drum 22 to occupy the position illustrated in FIG. 1, in which it is symmetrically arranged with respect to the outer portion of the coupling, i.e., the coupling plates 13 and 14 in the illustrated example.

The clutch includes a carrying ring or spider 29 which is generally of circular platelike formation and is provided with a plurality of bores 30 whereby it may be connected to the pinion shaft or other shaft 31 which is to be driven by the apparatus of the invention, being boltable thereto as indicated at 32. The spider 29 mounts a clutch housing 33 concentrically with respect to the coupling and in slightly outwardly spaced relation to the clutch drum 22. Mounted within the clutch housing 33, by means of pins 34, are a plurality of arcuate segmental clutch shoes 35. The clutch shoes 35 are shaped as arcs having the same radius as the outer circumference of the clutch drum 22. Each segmental clutch shoe 35 is provided with clutch lining material, as best seen at 36 in FIG. 1. The clutch shoes 35 are loosely fitted with respect to the pins 34, as indicated at 37, so as to be capable of a limited degree of radial movement toward and away from the clutch drum 22. Sufficient radial play is provided to enable the clutch shoes to be forced inwardly until the lining 36 of each clutch shoes 35 bears against the outer surface of the clutch drum 22. A tire 38 formed of rubber or some such expansible material is inserted within the clutch housing 33 between the outer wall thereof and the clutch shoes 35. A passageway for compressed air or some other suitable pressure fluid is provided longitudinally through the shaft 31, as indicated at 39, and through spider 29 as indicated at 40. The inlet then branches into a number of radial passageways 41 leading, via a plurality of connections 42, through a plurality of openings 43, into the tire 38. With this arrangement of passageways, compressed air or some other pressure fluid may be forced through the several passageways and into the tire 38, resulting in symmetric expansion of the tire.

Whenever it is desired to engage the clutch, one simply causes the tire 38 to expand until the lined clutch shoes 35 tightly frictionally engage the clutch drum 22. To disengage the clutch, it is only necessary to allow the tire 38 to become deflated by releasing the compressed air, whereupon the clutch 22 will ride entirely out of contact with the lining 36 on the several clutch shoes 35.

It will be noted that with the combined coupling and clutch of this invention, the shaft which is to be driven can be mounted closely adjacent the coupling, the only intervening element being the clutch carrying ring or spider 29. The extra supporting bearing which has been employed in the past when the coupling clutches have been mounted in line with one another is not required with the arrangement of the present invention.

The springs 28 permit axial movement of the clutch drum 22 when the clutch is engaged. This is advantageous because such movement prevents axial thrust being imparted from the shaft which is being driven to the crankshaft of the prime mover. The springs 28 act to return the clutch drum 22 to a preselected position symmetric with the coupling plates 13 and 14 as soon as the clutch drum is released by the clutch shoes 35, and also serve to prevent binding between the coupling plates 13 and 14 and the clutch drum bosses 26.

The invention includes an arrangement for driving of the shaft 31 in the case of an emergency such as failure of the supply of pressure fluid to the tire or failure of the tire itself. This emergency driving means consists of an annular plate 44 (See FIG. 3). This annular plate 44 may be bolted as indicated at 45 to the clutch housing 33, and further bolted as indicated at 46 to the outer coupling plate 13 at spaced points adjacent the periphery thereof. With this emergency arrangement the coupling will function to drive the shaft 31 despite mechanical failure of the coupling.

It should be appreciated that the invention is not limited to any particular type of flexible coupling. The illustrated coupling has simply been referred to by way of example. Any other form of flexible coupling could be employed, with the clutch drum being mounted concentrically with respect to the driven portion of the flexible coupling.

We claim:

1. A combined flexible coupling and clutch, said flexible coupling being of the type which comprises a driving portion, a driven portion concentrically mounted on said driving portion for rotation relative thereto and flexible means connecting said driving and driven portions; said clutch comprising a clutch drum concentrically mounted on said driven portion so as to be rotatable therewith but capable of limited axial movement with respect thereto, biasing means urging said clutch drum to normally occupy a position of symmetric alignment with said driven portion, a clutch housing independently mounted in concentric radially spaced relation to said clutch drum, means for rigidly connecting said housing to a shaft to be driven by said coupling, lined clutch shoes mounted within said clutch housing and movable radially toward and away from said drum, and means for forcing said clutch shoes into tight frictional engagement with said clutch drum.

2. A combined flexible coupling and clutch as defined in claim 1, in which said clutch drum is axially slidably mounted on a plurality of pins axially arranged at spaced intervals adjacent the perimeter of the driven portion.

3. A combined flexible coupling and clutch as defined in claim 2, in which said biasing means comprises a plurality of cylindrical springs mounted on said pins and bearing against said driven portion and the portions of said clutch drum which are mounted on the said pins, whereby said springs act to centralize the clutch drum relative to the said driven portion.

4. A combination of a flexible coupling and clutch as defined in claim 1, including a plate member rigidly connectible both to said driven portion of said coupling and to said clutch housing whereby to provide for emergency direct drive from said driven portion in the event of a mechanical failure within the clutch.

5. An improved combination of a flexible coupling with a friction clutch, said coupling being of the type comprising a stub shaft, a pair of circular plates mounted in parallel spaced apart relation on said stub shaft and in rotatable relation thereto, and flexible means providing a driving connection between said stub shaft and said circular plates; said clutch being mounted concentrically of the circular plates in outwardly spaced relation thereto and comprising a cylindrical clutch drum mounted concentrically with respect to said circular plates so as to be capable of limited axial movement with respect to said plates, biasing means urging said clutch drum to normally occupy a position of symmetric alignment with said circular plates, a clutch housing concentrically surrounding and spaced outwardly of the clutch drum, arcuate segmental clutch shoes mounted within said clutch housing so as to surround the clutch drum and be capable of limited movement radially of said drum, clutch lining material on said shoes, means for rigidly connecting said clutch housing to a shaft which is to be driven through said coupling, and means for forcing said clutch shoes into tight frictional engagement with said clutch drum.

6. An improved combination as defined in claim 5, in which said clutch drum is axially slidably mounted on a plurality of pins extending axially between said circular plates, said pins being located at spaced intervals adjacent the perimeters of said plates.

7. An improved combination as defined in claim 6, in which said biasing means comprises a plurality of cylindrical springs mounted on said pins and bearing against said circular plates and the portions of said clutch drum which are mounted on said pins, whereby said springs urge said clutch drum into symmetrical relationship with said circular plates.